United States Patent [19]

Hazan

[11] 4,115,227

[45] Sep. 19, 1978

[54] CATHODIC ELECTRODEPOSITION OF PAINTS

[75] Inventor: Isidor Hazan, Clementon, N.J.

[73] Assignee: E. I. Du Pont de Nemours and Company, Wilmington, Del.

[21] Appl. No.: 845,891

[22] Filed: Oct. 31, 1977

Related U.S. Application Data

[63] Continuation-in-part of Ser. No. 746,298, Dec. 1, 1976, abandoned.

[51] Int. Cl.$^2$ ............................................ C25D 13/06
[52] U.S. Cl. .............................. 204/181 C; 204/181 T
[58] Field of Search ........................ 204/181 C, 181 T

[56] References Cited

U.S. PATENT DOCUMENTS

| 3,928,157 | 12/1975 | Svematsu et al. | 204/181 C |
| 3,954,588 | 4/1976 | Hazan et al. | 204/181 T |

Primary Examiner—Howard S. Williams

[57] ABSTRACT

A process for cathodic electrodeposition of paints wherein a layer of protective phosphate salt is initially deposited on a metal substrate followed by an amine-group-containing hydrophobic polymer which is preferably an acrylic-epoxy resin. The amounts of water and phosphoric acid in the deposited paint are very small.

19 Claims, No Drawings

CATHODIC ELECTRODEPOSITION OF PAINTS

CROSS-REFERENCE TO RELATED APPLICATION

This application is a continuation-in-part of application Ser. No. 746,298 filed Dec. 1, 1976, now abandoned, and assigned to the assignee of the present application.

BACKGROUND OF THE INVENTION

The present invention relates to a method of cathodically depositing polymeric coatings. More specifically, it relates to a method of depositing coatings of acrylic polymers containing amine functionality with minimum retained water and acid in the coatings.

It is known that organic coatings can be electrodeposited either on an anodically-charged conducting substrate or on a cathodically-charged substrate. Although most of the earlier work in electrodeposition was done with anodic deposition, that type of process has certain disadvantages. Anodic electrodeposition is normally done in a coating bath having a basic pH. The pH decreases at the surface being coated, creating conditions which, when combined with the electrolytic action of the coating bath, can cause the dissolution of substrate metal ions and their subsequent deposition in the coatings being formed. This can be a source of staining and diminished corrosion resistance. Also, electrolysis tends to attack preformed phosphate coatings. Furthermore, oxygen formed at the anodic substrate being coated can cause a variety of difficulties such as degradation of coatings by oxidation.

Electro-endoosmosis tends to expel water from anodic coatings being formed, leading to low water retention with about 85 to 95% solids in the coatings. This is an advantage over cathodic coating in which this phenomenon would not be expected to be helpful. (Parts and percentages herein are by weight except where indicated otherwise, and the expression of a range as "X to Y" or as "X-Y", wherein X and Y are numbers, is meant to be inclusive of both X and Y.)

Cathodic electrodeposition has developed more slowly, due in part to the acidic pH needed for the bath. Also, water tends to be drawn into the coatings and held there, along with acid residues from the bath. It is apparent that this can lead to difficulties in the coatings. In contrast to the oxygen formed at anodes in anodic electrodeposition, hydrogen is formed at the cathode in cathodic electrodeposition. Even though this hydrogen can cause pinholes in coatings, it, of course, does not cause oxidative film degradation.

Prior to coating with protective organic coatings, metal surfaces, particularly iron and steel, are normally given a pretreatment such as phosphatizing. U.S. Pat. No. 870,937 — Coslett (1907) describes a method of treating iron or steel surfaces with phosphoric acid solutions which may include iron powder or iron phosphates. In the evolution of phosphatizing coatings for metals, particularly ferrous metals, several chemical modifications of the phosphate coating have been found desirable, including the incorporation of calcium and molybdenum into the coating and post-rinsing with chromate solutions.

Processes and compositions for the cathodic electrodeposition of paints are described in U.S. Pat. No. 2,345,543—Wohnsiedler, et. al., (1944), which uses a cationic melamine-formaldehyde resin, and in U.S. Pat. No. 3,922,212—Gilchrist (1975), among others. Gilchrist is directed to a process for supplementing the bath composition with a make-up mixture of materials containing an ionizing acid that is not consumed at as fast a rate as the resin. The acid is present in the make-up at lower concentrations than are used in the bath, so as not to build up the concentration of the acid in the bath. Gilchrist uses particular aminoalcohol esters of polycarboxylic acids and discloses that acrylic polymers can be codeposited with zinc phosphate from solution on a cathodic substrate at low pH's such as 2.7 with phosphoric acid as the ionizing acid.

Two U.S. patents dealing with nitrogen-based copolymers and their cathodic electrodeposition are U.S. Pat. Nos. 3,455,806 and 3,458,420, both to Spoor, et al., (1969). Cathodic sulfonium systems are described by Wessling et al. on pages 110-127 of "Electrodeposition of Coatings," Ed. E. F. Brewer, American Chemical Society (1973).

Electrodeposition processes have been frequently described in the literature. Two useful reviews of the technology are: "Electro-painting Principles and Process Variables," Brower, *Metal Finishing*, September, 1976, p. 58; and "Coatings Update: Electrocoating", Americus, *Pigment and Resin Technology*, August, 1976, p. 17. However, neither of these articles nor any of the patents mentioned above suggest means for obtaining cathodically electrodeposited resin coatings with optimally low levels of water and acid retention and high corrosion resistance.

SUMMARY OF THE INVENTION

The present invention provides a process for electrocoating with a coating composition a negatively-charged substrate immersed in a coating bath containing an aqueous dispersion of said coating composition, said bath having a cathode zone containing said substrate and an anode zone containing a charged anode, said substrate and said anode constituting oppositely-charged electrodes, the charged electrodes being maintained in electrical contact with each other by means of said bath, wherein said bath comprises a cationic film-forming polymer, an acidic ionizing agent, and a crosslinking agent, the improvement which comprises:

employing phosphoric acid as an acidic ionizing agent;

employing as a cationic film-forming polymer a graft copolymer having a backbone portion containing secondary and/or tertiary amine functionality, said graft copolymer being stabilized in the aqueous dispersion by a phosphate salt of the amine functionality, said backbone portion being graft polymerized with hydrophobic copolymer derived from epoxy esters, said hydrophobic copolymer having a high enough concentration in the graft copolymer that the coating deposited on the substrate has at least about 83% solids content and so that the phosphoric acid concentration in the deposited coating composition is no more than about 17.5% of the phosphoric acid concentration in the bath; and employing as the crosslinking agent a composition which is nonreactive in the bath but reactive with said film-forming polymer at elevated temperatures.

The invention also comprises acrylic resins particularly suited for use in coating compositions for the processes of the invention, including both a resin suitable for use in primer compositions and a resin suitable for top-coat compositions which can be used either as a single coat or applied cathodically over an electrically-conductive primer.

The primer resin is a graft copolymer of an epoxide grafted onto an acrylic backbone and consisting essentially of, by weight based on the graft copolymer, about:

a. in the acrylic backbone portion: 15 to 25% of a polymer or copolymer of at least one unit selected from alkyl, aminoalkyl, and hydroxyalkyl acrylates and methacrylates, said copolymer containing 0.02 to 0.1 (preferably 0.02 to 0.06) equivalent of secondary and/or tertiary amine functionality and optionally 0.01 to 0.05 (preferably 0.01 to 0.02) equivalent of quaternary ammonium functionality; and b. in the graft: 75 to 85% of a copolymer contributing:
   3 to 7% of a glycidyl ester of a tertiary carboxylic acid containing 7 to 9 carbon atoms, and
   72 to 80% of a blend of a 55 to 60% condensation polymer of epichlorohydrin and bisphenol-A with 15 to 20% tall oil fatty acids.

(Equivalents herein means equivalents of functionality per 100 grams of graft copolymer.)

One preferred embodiment is a graft copolymer consisting essentially of, by weight based on the graft copolymer, about:

a. 17 to 21%, preferably 19%, of a copolymer contributing:
   3 to 5%, preferably 4%, methyl methacrylate,
   4 to 6%, preferably 5%, butyl acrylate,
   1 to 4%, preferably 3%, hydroxyethyl methacrylate,
   1 to 3%, preferably 2%, dimethylamino ethyl methacrylate, and
   4 to 6%, preferably 5%, t-butylamino ethyl methacrylate, graft polymerized with b. 83 to 79%, preferably 81%, of mixture of about 5% of

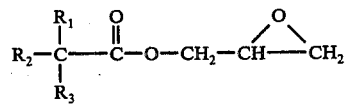

wherein the $R_1$, $R_2$ and $R_3$ groups are saturated aliphatic chains which contain a total of 7 to 9 carbon atoms, and at least one of $R_1$, $R_2$ and $R_3$ is a methyl group, and 74 to 78%, preferably 76%, of a blend of
   57 to 60%, preferably 58.5%, of a condensation polymer of
   27 to 31%, preferably 29.25%, epichlorohydrin and 27 to 31%, preferably 29.25%, bisphenol-A with 16 to 19%, preferably 17.5%, tall oil fatty acids.

The top-coat resin is a copolymer of an epoxide grafted onto an acrylic backbone which consists essentially of, by weight based on the graft copolymer, about:

a. in the acrylic backbone portion: 80 to 92% of a polymer or copolymer of at least one unit selected from alkyl, aminoalkyl, and hydroxyalkyl acrylates and methacrylates, said copolymer containing 0.02 to 0.1 (preferably 0.02 to 0.08) equivalent of secondary and/or tertiary amine functionality and optionally 0.01 to 0.05 (preferably 0.01 to 0.03) equivalent of quaternary ammonium functionality; and b. in the graft: 20 to 8% of a comonomer which is a glycidyl ester of a tertiary carboxylic acid containing 7 to 9 atoms.

One preferred embodiment is a graft copolymer of claim 17 consisting essentially of, by weight based on the graft copolymer, about:

a. 85 to 91%, preferably 89%, of a copolymer contributing:
   9 to 11%, preferably 10%, methyl methacrylate,
   42 to 46%, preferably 44%, 2-ethyl hexyl acrylate,
   6.5 to 8.5%, preferably 7.5%, t-butylaminoethyl methacrylate,
   2 to 3%, preferably 2.5%, dimethylaminoethyl methacrylate, and
   23 to 27%, preferably 25%, hydroxyethyl methacrylate, graft polymerized with b. 15 to 9%, preferably 11% of

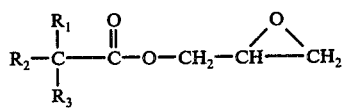

wherein the $R_1$, $R_2$ and $R_3$ groups are saturated aliphatic chains which contain a total of 7 to 9 carbon atoms, and at least one of $R_1$, $R_2$ and $R_3$ is methyl group.

DETAILED DESCRIPTION OF THE INVENTION

The present invention provides a practical means for cathodically electrodepositing first a passivating phosphate salt coating, preferably as at least a monolayer, and then electrodepositing over the phosphate a protective resin coating having low water and acid retention and high resulting durability and corrosion resistance. The process of the invention can be used either on pre-treated metal such as phosphatized steel or on bare metal such as steel which has been cleaned but not phosphatized. It can also be used on other metal substrates containing zinc, such as galvanized steel, as well as on aluminum and various alloys. Since the process of the invention deposits a phosphate coating underneath the polymer coating, it is less sensitive than other electrocoating processes to variations in the substrate and its pretreatment. If the process of the invention is applied to material which has already been phosphatized, this versatility of the invention would enhance the phosphate coating. However, phosphate pretreatment is not necessary.

The invention preferably provides in the bath a water-soluble dihydrogen phosphate salt $M(H_2PO_4)_2$ (M=Fe,Zn,Ca,Mg or Al). With cathodic electrodeposition of the invention, the pH rises at the cathode, creating a boundary layer perhaps 0.01 to 0.1 cm thick, in which the soluble phosphate salt converts to an insoluble phosphate salt, $M(HPO_4)$ or $M_3(PO_4)_2$, which is deposited onto the substrate surface. Thus, the driving force for the salt deposition is a pH change and precipitation at the substrate surface. The same type of pH change phenomenon also causes deposition of dense polymer coatings with the present invention. This leads to denser coatings than electrophoresis of quaternary ammonium salts wherein a concentration gradient is the main driving force.

In a specific embodiment of the invention, with the coating voltage applied while a ferrous metal substrate is being immersed into the coating bath, the phosphoric acid in the bath dissolves small amounts of ferrous ion from the substrate. The $Fe(H_2PO_4)_2$ salt so formed is soluble in the bath at pH levels of 3.0 or below. However, a boundary layer of increased pH quickly develops at the substrate, leading to the formation and deposition on the substrate of the insoluble salts $Fe(HPO_4)$ and $Fe_3(PO_4)_2$. These salts give effective corrosion protection which is enhanced by the fact that they generally form a continuous layer on the substrate, usually at least a monolayer, rather than being entirely dispersed up into the overlying subsequently-formed resin coating. In a preferred embodiment of the invention, water-soluble zinc salts are included in the bath, and they too deposit as insoluble phosphates at the substrate. The dihydrogen phosphate of zinc, $Zn(H_2PO_4)_2$, is stable in the bath at a pH of 2.5 to 3.5. The invention is useful at pH values in the range of 2.0 to 4.0, preferably 2.5 to 3.0. At a pH below about 3.0, free phosphoric acid in the bath will react with ferrous metal substrates to generate the soluble dihydrogen phosphate of iron, $Fe(H_2PO_4)_2$. Since the solubility of the dihydrogen metal phosphates decreases with increasing temperature, the process of the invention is best operated with a bath temperature of 20° to 25° C. When zinc salts are dissolved in the bath, the phosphate coating formed on the steel may likely include two minerals as the principal constituents. These are phosphophyllite, $Zn_2Fe(PO_4)_2.4H_2O$, and hopeite, $Zn_3(PO_4)_2.4H_2O$.

The lack of practical success of several previous cathodic electrodeposition painting processes is due at least in part to the amount of water that is held in the resin coating and the acids and salts that are dissolved in that water, not readily removable from the coating. The water can lead to coating failure by various mechanisms, and the acid residues can encourage subsequent corrosion, either directly or by providing a hygroscopic material in the coating which encourages penetration of water and other corrosive agents.

In contrast to the useful effect of electroendoosmosis at the anode in anodic electrodeposition of paint which tends to expel water from an anodic coating, water is not electrically expelled from a cathodic coating and may actually be drawn into the coating by electrical forces. However, water held in a cathodic coating can be particularly undesirable. To minimize such effects, the present invention provides resins with a degree of hydrophobicity and hardness or denseness of the coating which combine to expel water from the coating as the coating is formed.

The desirable effects of the invention are achieved by using certain hydrophobic graft copolymers containing in their backbone portions secondary and/or tertiary amine functionality. Such functionality aids in adhesion of the resin coating to the substrate even after heating the deposited coatings to cause them to crosslink. This is an advantage over cathodic sulfonium systems in which hydrophobicity is only developed after thermal decomposition of the sulfonium groups. Thermal decomposition of sulfonium groups during crosslinking of the film would make them unavailable for enhancing adhesion of the resin coating to the substrate. Also, although quaternary ammonium salts can be present in film-forming polymers of the invention, they cannot replace the secondary or tertiary amine groups. The quaternary ammonium salts would decompose to some extent when the film is heated to cause crosslinking, thereby losing their effectiveness in promoting adhesion to the substrate. The polymer compositions of the invention are discussed in more detail below.

In the process of the invention, although there are advantages in using live entry, in which the coating voltage is applied while the articles to be coated are being immersed into the bath, it will be apparent that reduced voltage can be applied upon entry if desired for certain special effects. However, the additional electrical apparatus required for reduced voltage entry is not normally necessary or desirable. It is desirable for the coated substrate to be removed from the bath with the coating voltage still applied or soon after it is turned off.

For operating electrocoating baths of the invention, the tank can be lined with an organic coating resistant to the acidic pH of the bath, and stainless steel or plastic piping and pump parts can be used to minimize corrosion. However, carbon steel parts often can be used, and the ferrous ions added to the bath by gradual dissolution of the equipment could be helpful rather than harmful to the coating process. Due to its autopassivating effects, phosphoric acid is less corrosive to steel than some other mineral acids as the pH levels used, so that more expensive materials of construction often are not necessary.

It has been found that common bacteria do not grow in the aqueous coating compositions of the invention. Therefore, ordinary ultrafiltration can be used in recirculating the bath components to rinse contaminants from the coated parts. Furthermore, membranes and ordinary flushed anodes may be desirable but are unnecessary. As an alternative to flushed anodes, excess phosphoric acid build-up in the bath can be consumed by additions of zinc, ZnO, $Zn(OH)_2$, or other metals or compounds which form the dihydrogen metal phosphates in solution.

Although an uncoated tank can be used as the anode, in commercial practice one would normally use stainless steel anodes having a surface area smaller than that of the cathodic substrate which is to be coated. This gives a favorable current density distribution.

In the novel electrocoating process, the metal article providing the substrate to be coated is immersed in a bath of an electrocoating cell. The bath is an aqueous dispersion of about 2–35% by weight of a cationic film-forming polymer at least partially neutralized with an acidic material. Preferably phosphoric acid is used in an amount of from 60% of that required for stoichiometric reaction of the first hydrogen of the trivalent acid with all of the available amine group bonds in the polymer to an excess of 120% of stoichiometric. The use of less than about 60% of the stoichiometric amount of phosphoric acid can lead to instability in the bath. More than 120%, even as high as 270% or higher, can sometimes be tolerated, even though a low pH limit of 2.2 to 2.5 is approached as more free phosphoric acid is present. In the presence of the acid, the film-forming polymer forms cations in the bath.

The metal article is connected to the negative side of a direct current (D.C.) power source to become the cathode of the cell. A voltage of about 1 to 500 volts is passed through the cell for the full dwell time of the article in the bath, about 0.01 to 5 minutes, and a coating of the cationic polymer is deposited. When the coating reaches the desired thickness, the article is removed from the bath. Preferably, the article is rinsed with water or with filtrate taken from the process to remove excess coating. Then the article is dried at ambient temperatures or baked for about 5 to 40 minutes at about 100° to 300° C. to give a finished coating about 0.1 to 5 mils thick. Typical efficiencies of about 30 mg film solids deposited per coulomb of electricity are obtained.

The current density used in the electrocoating cell generally does not exceed 1.85 amperes/cm$^2$ (0.3 amperes/in$^2$) of anode surface which is immersed in the bath, and it is preferable to use lower current densities. In the deposition of the cationic film-forming polymer, voltages of 5 to 400 for 0.25 to 2 minutes are preferred to form a high quality finish.

Coating compositions of the present invention can contain pigments. The pigments are normally added to the composition in the usual manner by forming a mill base or pigment dispersion with the pigment and the aforementioned cationic film-forming polymer or another water-dispersible polymer or surfactant. This mill base is then blended with additional film-forming constituents and the organic solvents. When the mill base is subsequently acidified and dispersed in water, the polymers tend to wrap themselves around the pigments. This has the effect of preventing destabilization of the dispersion or other undesirable effects that could come from using a basic pigment such as TiO$_2$ in an acidic dispersion. Pigments stable in acidic media can be used, such as the surface-treated TiO$_2$ pigments of U.S. Pat. No. 3,941,603 — Schmidt (1976). Other pigments that could be used include metallic oxides such as zinc oxides, iron oxides, and the like, metal flakes such as aluminum flake, metal powders, mica flakes with and without surface treatment such as with titania and carbon black, chromates such as lead chromates, sulfates, carbon black, silica, talc, aluminum silicates including china clay and finely divided kaolin, organic pigments and soluble organic dyes.

Aside from cathodic electrodeposition, the novel coating compositions of the present invention can also be applied by any conventional method such as spraying, electrostatic spraying, dipping, brushing, flowcoating and the like. Reaction of the amine groups of the polymer with phosphoric acid is generally not necessary when the coating composition is to be used for purposes other than electrodeposition. Organic thermally decomposable acids, such as formic acid, can be used to obtain water solubility for such purposes. The coating would then be baked for about 5 to 40 minutes at about 175° to 200° C to give coatings of about 0.1–5 mils thickness. When applied by cathodic electrodeposition, coating compositions of the invention are preferably applied to give dried thicknesses of about 0.8–1.2 mils.

A crosslinking agent which can be water dispersed along with the film-forming constituent is used in the novel composition. Based on the proportions of solids in the bath, which are roughly equal to the proportions of solids in the film, about 60 to 95%, preferably about 70%, of cationic film-forming polymer are used along with about 5 to 40%, preferably about 30%, of crosslinking agent.

Typical crosslinking agents that can be used with the invention are melamine formaldehyde, alkylated melamine-formaldehyde resins such as hexakis-(methoxymethyl) melamine and partially-methylated melamine formaldehyde resins, butylated melamine formaldehyde resins, methylated urea-formaldehyde resins, urea-formaldehyde resins, phenolformaldehyde and the like. One particularly useful crosslinking agent which forms a high quality product with the cationic polymers is a benzoguanamine-formaldehyde resin. A preferred benzoquanamine formaldehyde resin is XM 1125 produced by American Cyanamid Co., an acidic self-catalyzed crosslinking agent with an acid number of 25 to 32.

When the novel compositions of this invention are used as primers over metals including treated and untreated steel, aluminum and other metals, conventional acrylic enamels, acrylic dispersion enamels and other coating compositions can be applied directly as topcoats over such primers. Acrylic lacquers, acrylic dispersion lacquers, and acrylic powder coatings can be applied over the novel compositions, but a suitable intermediate coat such as a sealer can be used to improve adhesion of the lacquer or powder topcoat to the primer.

The glycidyl ester used in both the primer and topcoat compositions and the optional epoxy-fatty acid constituents used in the primer composition contribute sufficient hydrophobicity to the polymer so that the electrodeposited film contains at least about 83% solids, and preferably 85 to 95% solids. Although such high solids levels are not uncommon for anodically deposited coatings, they are not readily achieved in cathodic electrodeposition because of the amount of water usually entrapped. The phosphoric acid concentration of the electrodeposited film is in the range of 10 to 15% of the concentration of phosphoric acid in the bath. This is on the order of about 0.05% of the electrodeposited film itself. These figures apply to the film as electrodeposited, before drying and baking. The amine functionality in the film causes some small phosphate concentration in the film, but retained water will deleteriously increase the phosphoric acid content. Empirical tests have shown that 20 to 25% of the concentration of phosphoric acid in the bath being present in the film is an undesirable level, causing diminished corrosion resistance, blistering, and other undesirable effects.

In the process of the invention, the critical concentration of phosphoric acid in the dry film is specified in terms of a percentage of the concentration of phosphoric acid in the bath. Equivalents of phosphoric acid, in the form of phosphates reacted with amine groups of the polymer and metal phosphate salts, are included in the term "phosphoric acid" for these purposes. Relative to the entire electrodeposited coating, the metal phosphate layer directly on the substrate will contribute negligible amounts of phosphate. Most of the phosphoric acid equivalents will be present as free phosphoric acid or as amine salts along with the water entrapped in the film. The amount of phosphate ionically bound in the polymer will vary depending on the amount of amine in the polymer. Larger amounts of amines will lead to larger amounts of bound phosphate reacted with them. Most of the phosphate is released from the polymer as phosphate ion as a result of pH change and electrical phenomena when the polymer is deposited on the substrate, but a variable amount remains in the film. The most reliable measurement of the concentration of phosphate to be deposited is as a proportion of the concentration in the bath. This is a dynamic value which depends upon coating speed, dragout and flushing rates. It is best averaged over a period of time as phosphoric acid is added to the bath and partially removed in the coatings.

Although the present invention uses phosphoric acid for several reasons, most importantly to allow the production of a phosphate coating on the substrate in the same process that produces the paint coating, other acids could be used in addition to the phosphoric acid for similar results. Acids which form water soluble salts of the desirable metals at low pH, especially such salts of zinc, iron, calcium, magnesium and aluminum, and which then convert to insoluble salts in the boundary layer at increased pH, can be useful. Oxalic, chromic, sulfamic, benzoic and boric acids can have such effects. However, the deposited salts of such acids in the absence of phosphates may not have the passivating or corrosion-inhibiting effects of phosphates.

Compositions of the invention can include additional adjuvants that do not materially change the basic and novel characteristics of the invention and thus are within the scope of "consisting essentially" terminology. Some such adjuvants are thickeners, defoamers, pigments, microgels, pigments dispersants, polymeric powders, microbiocides, and coalescing solvents. Typical coalescing solvents which might be used at a concentration of about 0.5% of the total bath volume are ethylene glycol monobutyl ether, diethylene glycol monobutyl ether, and cyclohexanol.

The graft copolymers of the invention can have backbone portions of a variety of types so long as they contain the requisite amine functionality and are made adequately hydrophobic by grafting with epoxy copolymers. The preferred backbone portions are acrylics, including alkyl acrylates such as methacrylics, and polymers derived from acrylics and methacrylics. Other useful backbone portions include polyamines of maleinized oils, polyesters, maleinized polybutadiene, and epoxidized oils.

Secondary amines in the backbone portion of the graft copolymer can function similarly to tertiary amines. Secondary amines can be provided, for instance, by reacting glycidyl methacrylate with ammonia to form a primary amine which is converted to a secondary amine on grafting with appropriate amounts of epoxies. It should be kept in mind that graft copolymerization to produce compositions of the invention changes secondary amines in the reactants to tertiary amines and likewise changes primary amines to secondary amines and tertiary amines to quaternary ammonium salts.

Quaternary ammonium salts would be coated onto the substrates mainly by concentration gradient effects rather than by pH changes in the narrow boundary zone which cause the deposition of secondary and tertiary amines. The concentration gradient effect is more gradual than the boundary zone effect, leading to softer, less dense coatings in the absence of the secondary and tertiary amine groups. Such softer coatings would be bulkier and more porous and, therefore, more conductive. This means that they would continue to build up in thickness with further electrodeposition. In contrast, the self-limiting effect of less conductive films gives coatings of more uniform thickness. In addition to increasing the adhesion of the film to the substrate after baking, secondary and tertiary amines in the backbone portion also enhance stability of the polymer in water dispersions.

For enhanced adhesion to substrates and dispersion stability in water, the film-forming polymer of the invention preferably contains 0.04–0.8 equivalent of tertiary amine functionality. The preferred primer contains about 0.04 equivalent, and the preferred topcoat contains about 0.05 equivalent of tertiary amine functionality. The preferred secondary amine before grafting is t-butyl amino ethyl methacrylate, and the preferred tertiary amine is dimethylaminoethyl methacrylate.

Tertiary amines in the acrylic backbone portion before graft copolymerization which are converted to quaternary ammonium salts upon grafting serve the useful purpose of enhancing the graft copolymerization. Therefore, graft copolymers of the invention preferably contain about 0.01 to 0.05 (more preferably about 0.01 to 0.02) equivalent of quaternary ammonium functionality. However, the quaternary ammonium functionality need not be built into the backbone portion but can be provided as an external catalyst to enhance the graft polymerization. In such a case, the somewhat deleterious effects of quaternary ammonium functionality in the backbone portion of electrodeposited coatings are avoided.

Although it is difficult to meaningfully quantify the softness or hardness of the resin, it is known that certain resins of the invention have a degree of hardness which is useful in combination with the hydrophobicity characteristics of the resins in forcing water out of films to obtain the indicated levels of retained water and acid.

The molecular weights of polymers of the invention are generally not critical. However, typical average molecular weights determined by gel permeation chromatography are: for the backbone portion — 12,000; for the primer graft copolymer — 11,000 to 12,000; and for the topcoat graft copolymer — 15,000. These figures show that typically 80 to 85% of the epoxide is grafted onto the backbone portion.

Although thoughts are expressed herein on why and how the advantages of the invention are obtained, the invention is described by the claims and does not depend upon theories.

Specific examples will now be given of the preparation of graft copolymers of the invention and their use in cathodic electrodeposition processes of the invention.

EXAMPLE I

A black primer coating composition is prepared and used as follows:

Part I and Part II describe the two resin compounds that are graft polymerized and used with the pigment dispersions of Part III in the paint of Part IV.

Part I

This part describes the preparation of an epoxy ester for graft copolymerization.

The following ingredients are charged into a reaction vessel equiped with a stirrer, thermometer, reflux condenser and a heating mantle to form an epoxy ester resin solution:

| Portion I | Parts by Weight |
|---|---|
| Epoxy resin (Epon 1001) | 1677.00 |

(Epon 1001 is an epoxy resin of the formula

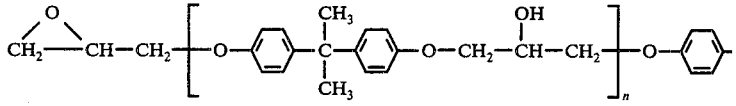

where $m$ is an integer sufficiently large to provide a Gardner-Holdt viscosity at 25° C of D-G measured in a 40% weight solids polymer solution using ethylene glycol monobutyl ether solvent; and the resin has an epoxide equivalent of 450-550.

| Portion 2 | |
|---|---|
| Tall oil fatty acids | 503.10 |
| Benzyl trimethylamonium hydroxide | 1.70 |
| Portion 3 | |
| Ethylene glycol monoethyl ether | 419.30 |

Portion 1 is charged into the reaction vessel, blanketed with nitrogen and heated to about 128° to 140° C to melt the resin. Portion 2 is then added, and the ingredients are heated to about 150° to 160° C for about 3 hours with constant agitation until the reaction mixture has an acid number of 0.01. Portion 3 is added, and the ingredients are cooled and filtered.

The resulting epoxy ester resin solution has a solids content of about 84%, an acid number no higher than 0.01, an epoxide equivalent of 1300-1900, and a Gardner-Holdt viscosity of D-F at 25° C in a 40% solids polymer solution using ethylene glycol monoethyl ether solvent.

PART II

This part describes the preparation of an acrylic resin and the graft polymerization of the epoxy ester described above onto it.

| Portion 1 | Parts of Weight |
|---|---|
| Isopropanol | 400.00 |
| Portion 2 | Parts by Weight |
| methyl methacrylate monomer | 100.00 |
| Butyl acrylate | 125.00 |
| Tertbutylaminoethylene methacrylate | 140.00 |
| Dimethylaminoethyl methacrylate | 40.00 |
| Hydroxyethyl methacrylate | 75.00 |
| Portion 3 | |
| Isopropanol | 100.00 |
| Methylethyl ketone | 25.00 |
| Azobisisobutyronitrile | 10.00 |
| Portion 4 | |
| Methylethyl ketone | 8.00 |
| Azobisisobutyronitrile | 1.00 |
| Portion 5 | |
| Ethylene glycol monoethyl ether | 350.00 |
| Portion 6 | |
| Epoxy ester prepared in Part I | 2300.00 |
| Ethylene glycol monoethyl ether | 350.00 |
| Cardura E-10 | 125.00 |
| (glycidyl ester of epichlorohydrin reacted with versatic acid 911 produced by Shell Oil Co.) | |
| Dionized water | 50.00 |

Portion 1 is charged into a reaction vessel, equipped as described above, and is heated to its reflux temperature. The reaction mixture is held under nitrogen during the entire reaction. Portions 2 and 3 are separately premixed and added slowly simultaneously over a 90-minute period while maintaining the reaction mixture at its reflux temperature. The reaction is continued for an additional 60 minutes. The Portion 4 is added, and the reaction mixture is held at its reflux temperature for an additional 30 minutes. Stripping of the reaction solvent is conducted simultaneously with the addition of Portion 5 which is to replace the reaction solvent. When 533.00 parts of solvent are stripped and all of Portion 5 is added to the reaction vessel, Portion 6 is added and the temperature is brought at 115° C to 117° C and maintained for 4 hours with continuous agitation. At the end of that period the epoxy number is determined. When the epoxy equivalent is zero or less than 1 epoxy unit per 500,000 gm, the reaction is finished. The solids content is 70%, and the Gardner-Holdt viscosity at 25% reduction of solids with ethylene glycol monoethylether is U to X.

PART III

A black pigment dispersion is prepared as follows:

| | Parts by Weight |
|---|---|
| Solution polymer prepared in Part II | 318.00 |
| Ethylene glycol monoethylether | 84.00 |
| Carbon black pigment | 31.80 |

The above ingredients are premixed and charged into a conventional sand mill and ground at a rate of 30 gallons per minute while controlling the temperature of the mixture below 70° C. The resulting carbon black dispersion has about 58% solids content.

An extender pigment dispersion using Al-silicate as the extender pigment is prepared as follows:

| | Parts by Weight |
|---|---|
| Solution polymer prepared in Part II | 193.00 |
| Ethylene glycol monoethylether | 142.00 |
| Aluminum silicate | 206.00 |

The above ingredients are premixed and charged into a conventional sand mill and ground at a rate of 30 gallons per minute while controlling the temperature of the mixture below 70° C. The resulting aluminum silicate dispersion has about 63% solids.

A water soluble phosphate salt of zinc, zinc dihydrogen phosphate, that is added to the coating composition of above polymer to improve its corrosion resistance when cathodically electrodeposited, is prepared as follows:

| | Parts by Weight |
|---|---|
| ZnO (zinc oxide) | 4.00 |
| Phosphoric acid (85%) | 14.00 |
| Deionized Water | 500.00 |

The above ingredients are mixed for 5 to 8 hours at room temperature unitl complete solubility of the zinc oxide takes place. The pH of the solution is 2.6 to 3.0.

PART IV

The electrocoating composition of a flated black paint is prepared as follows:

| Portion 1 | Parts by Weight |
|---|---|
| Resin solution of Part II | 320.00 |
| Black pigment dispersion of Part III | 97.00 |
| Aluminum silicate pigment dispersion of Part III | 440.00 |
| Benzoguanamine formaldehyde solution (XM 1125 produced by American Cyanamid Co., 85% in ethylene glycol monobutyl ether) | 190.00 |
| Portion 2 | |
| Deionized water | 632.00 |
| Phosphoric acid (85%) | 22.00 |
| Portion 3 | |
| Zinc dihydrogen phosphate | 510.00 |

Portion 1 is added into a mixing vessel, heated to 150° F and mixed for 3 hours, maintaining a temperature of 150° F. Portion 2 is added into another mixing vessel mixed for 10 minutes, and Portion 1 is added into Portion 2 with continuous agitation. The pigmented water dispersion is mixed for 2 hours and diluted to about 15% solids with deionized water and Portion 3 so that the concentration of zinc dihydrogen phosphate salt in the paint dispersion will be 450 ppm based on the total weight of the electrocoating composition.

The electrocoating composition, having a pH of 2.7 and a conductivity of 1700 micromhos, is charged into a stainless steel tank for electrodeposition. An untreated cold rolled steel panel or a phosphatized steel panel is positioned in the center of the tank, electrically connected to the negative side of a DC power source, and forms the cathode of the electrocoating cell. The tank is connected to the positive side of a DC power source and forms the anode of the cell. A direct current of 150 volts is applied to the cell for 2 minutes at an ambient temperature of 20°-25° C, and a paint film of about 0.6 mils is deposited on the panel. The coated metal panel is removed from the electrocoating cell, washed and baked at about 160° C for 30 minutes. The resulting primer film has excellent adhesion to the metal substrate, is hard and has very good corrosion and saponification resistance over bare cold rolled steel and phosphatized steel. An acrylic enamel adheres to the primer film, and conventional acrylic lacquers can be applied with a conventional sealer coat over the primer to form a high quality finish.

Typical deposited films contain 90 to 95% solids and 10 to 12% of the phosphoric acid present in the bath.

This coating composition is particularly useful for priming automobile and truck bodies by electrodeposition for maximum corrosion protection over all parts of the car including areas of poor phosphate pretreatment or no pretreatment at all.

EXAMPLE II

A white pigment dispersion is prepared as follows:

| | Parts by Weight |
|---|---|
| Solution polymer of Part II of Ex. I | 314.00 |
| Ethyleneglycol monoethylether | 137.00 |
| Titanium Oxide | 549.00 |

The above ingredients are premixed and charged into a conventional sand mill and ground at a rate of 30 gallons per minute while controlling the temperature of the mixture below 70° C. The resulting titanium oxide dispersion has about 76% solids content.

A white coating composition is prepared as follows:

| Portion 1 | Parts by Weight |
|---|---|
| Resin solution of Part II of Ex. 1 | 560.00 |
| Benzoguanamine formaldehyde resin solution (85% in ethylene glycol monobutyl ether) | 245.00 |
| Titanium dioxide pigment dispersion | 700.00 |
| Portion 2 | |
| Phosphoric acid (85%) | 30.00 |
| Deionized water | 1400.00 |

An electrocoating composition of 15% solids and pH of 2.8 is prepared using Portions 1 and 2 and electrocoated following the procedure described in Example 1.

This coating composition is useful either as a primer or as a single coat directly on metal for appliances or industrial equipment. It has good corrosion resistance and detergent resistance over bare cold rolled steel or phosphatized steel.

Coatings prepared as in Example I give similar results.

EXAMPLE III

| Portion 1 | Parts by Weight |
|---|---|
| Isopropanol | 1200.00 |
| Portion 2 | |
| Methylene methacrylate | 300.00 |
| 2-Ethylhexyl acrylate | 1000.00 |
| Tert-butylamino methyl methacrylate | 180.00 |
| Dimethylamino ethyl methacrylate | 60.00 |
| Hydroxy ethyl methacrylate | 600.00 |
| Azobis-isobutyronitrite | 40.00 |
| Portion 3 | Parts by Weight |
| Azobis isobutyronitrile | 2.00 |
| Acetone | 15.00 |
| Portion 4 | |
| Ethylene glycol monoethyl ether | 900.00 |
| Portion 5 | |
| Cardura E-10 (Shell Oil Co. product) | 260.00 |

Portion 1 charged into a reaction vessel equipped as described above and is heated to its reflux temperature. The reaction mixture is held under nitrogen during the entire reaction.

Portion 2 is separately premixed and added slowly simultaneously over a 90-minute period while maintaining the reaction mixture at its reflux temperature. The reaction is continued for an additional 60 minutes. Then Portion 3 is added, and the reaction mixture is held at its reflux temperature for an additional 30 minutes. Stripping of the reaction solvent takes place simultaneously with addition of Portion 4 which is to replace the reaction solvent. 1200.00 parts of solvent are stripped, and all of Portion 4 is added to the reaction vessel. Then Portion 5 is added, and the temperature is brought to 115° to 117° C where it is maintained for 4 hours with continuous agitation. At the end of that period, the epoxy number is determined. When it is zero or less than 1 epoxy unit per 500,000 gm, the reaction is finished. The solids content is 70%, and the product has a Gardner-Holdt viscosity of $Z_2$-$Z_4$.

Coatings are prepared as in Example I. Typically the coatings contain 85 to 90% solids and 15% of the phosphoric acid present in the bath.

EXAMPLE IV

A white pigment dispersion is prepared as follows:

|  | Parts by Weight |
|---|---|
| Resin solution of Example III | 320.00 |
| Ethylene glycol monoethyl ether | 140.00 |
| Titanium oxide | 550.00 |

The above ingredients are premixed and charged into a conventional sand mill, and ground at a rate of 30 gallons per minute while controlling the temperature of the mixture below 70° C. The resulting titanium oxide pigment dispersion has about 76% solids content.

A white coating composition is prepared as follows:

| Portion 1 |  |
|---|---|
| Resin solution of Example III | 560.00 |
| Benzoquanamine formaldehyde resin solution (85% in ethylene glycol monobutyl ether) | 250.00 |
| Titanium oxide pigment dispersion | 700.00 |
| Portion 2 |  |
| Phosphoric acid (85%) | 30.00 |
| Deionized water | 1400.00 |
| Portion 3 |  |
| Zinc dihydrogen phosphate | 510.00 |

Using Portions 1, 2 and 3, an electrocoating composition of 15% solids and a pH of 2.7 is prepared and electrocoated following the procedure described in Example I.

This coating composition is particularly useful as a single coat directly on metal finishes that require good gloss and gloss retention after UV exposure, and good corrosion resistance regardless of the type and quality of pretreatment. It also enables one to obtain a white finish without the typical discoloration characteristics of an electrocoating finish.

Coatings prepared as in Example I give similar results.

What is claimed is:

1. In a process for electrocoating with a coating composition a negatively-charged substrate immersed in a coating bath containing an aqueous dispersion of said coating composition, said bath having a cathode zone containing said substrate and an anode zone containing a charged anode, said substrate and said anode constituting oppositely-charged electrodes, the charged electrodes being maintained in electrical contact with each other by means of said bath, wherein said bath comprises a cationic film-forming polymer, an acidic ionizing agent, and a crosslinking agent, the improvement which comprises:

employing phosphoric acid as an acidic ionizing agent;

employing as a cationic film-forming polymer a graft copolymer having a backbone portion containing secondary and/or tertiary amine functionality, said graft copolymer being stabilized in the aqueous dispersion by a phosphate salt of the amine functionality, said backbone portion being graft polymerized with hydrophobic copolymer derived from epoxy esters, said hydrophobic copolymer having a high enough concentration in the graft copolymer that the coating deposited on the substrate has at least about 83% solids content and so that the phosphoric acid concentration in the deposited coating composition is no more than about 17.5% of the phosphoric acid concentration in the bath; and employing as the crosslinking agent a composition which is nonreactive in the bath but reactive with said film-forming polymer at elevated temperatures.

2. A process according to claim 1 in which the phosphate ion is present in the bath in an amount of about 60 to 120% of the amount required to react with all of the amine functionality present.

3. A process of claim 1 also employing in the bath dissolved dihydrogen phosphate salts of one or more of the metals zinc, iron, calcium, magnesium and aluminum.

4. A process of claim 3 in which a layer of insoluble phosphate salt of said metal is formed on the substrate beneath an organic layer of the film-forming polymer and crosslinking agent.

5. A process of claim 1 in which the bath is maintained at a pH in the range of 2.0 to 4.0 while electric current is passed through the bath to cause a deposition of cationic film-forming polymer and crosslinking agent on the substrate.

6. A process of claim 5 in which the pH is maintained in the range of about 2.5 to 3.0.

7. A process of claim 1 in which the substrate enters the bath with the coating voltage applied.

8. A process of claim 1 in which the substrate is removed from the bath with the coating voltage applied.

9. A process of claim 1 in which the substrate enters and is removed from the bath with the coating voltage applied.

10. A process of claim 1 in which the backbone portion is an acrylic polymer.

11. The process of claim 1 in which excess phosphoric acid build-up in the bath is consumed by additions of zinc, ZnO, or Zn(OH)$_2$.

12. In a process for electrocoating with paint a cathodically-charged substrate immersed in a coating bath containing an aqueous dispersion of said paint, said bath having a cathode zone containing said substrate and an anode zone containing a charged anode, the charged electrodes being maintained in electrical contact with each other by means of said bath, wherein said bath comprises a cationic film-forming polymer, an acidic ionizing agent, and a crosslinking agent, the improvement which comprises:

employing phosphoric acid as the acidic ionizing agent;

employing as the cationic film-forming polymer a graft copolymer comprising an epoxide grafted onto an acrylic backbone portion and consisting essentially of, by weight based on the graft copolymer, about:

a. in the acrylic backbone portion: 15 to 25% of a polymer or copolymer of at least one unit selected from alkyl, aminoalkyl, and hydroxyalkyl acrylates and methacrylates, said copolymer containing 0.02 to 0.1 equivalent of secondary and/or tertiary amine functionality; and b. in the graft: 75 to 85% of a copolymer contributing: 3 to 7% of a glycidyl ester of a tertiary carboxylic acid containing 7 to 9 carbon atoms, and 72 to 80% of a blend of a 55 to 60% condensation polymer of epichlorohydrin and bisphenol-A with 15 to 20% tall oil fatty acids; and employing as the crosslinking agent a composition which is nonreactive in the bath but reactive with said film-forming polymer at elevated temperatures to crosslink it to form a durable paint film.

13. A process of claim 12 in which the graft copolymer consists essentially of, by weight based on the graft copolymer, about:

a. 19% of a copolymer contributing:
   4% methyl methacrylate, 5% butyl acrylate, 3% hydroxyethyl methacrylate, 2% dimethylamino ethyl methacrylate, and 5% t-butylaminoethyl methacrylate,
   graft polymerized with b. 81% of a mixture of about 5% of $$R_2 - \underset{\underset{R_3}{|}}{\overset{\overset{R_1}{|}}{C}} - \overset{\overset{O}{\|}}{C} - O - CH_2 - \overset{O}{\overset{/\backslash}{CH - CH_2}}$$

wherein the $R_1$, $R_2$ and $R_3$ groups are saturated aliphatic chains which contain a total of 7 to 9 carbon atoms, and at least one of $R_1$, $R_2$ and $R_3$ is a methyl group, and 76% of a blend of
   58.5% of a condensation polymer of 29.25% epichlorohydrin and 29.25% bisphenol-A with 17.5% tall oil fatty acids and in which the crosslinking agent is a benzoguanamine formaldehyde resin.

14. A process of claim 12 in which the bath also contains dissolved dihydrogen phosphate salts of one or more of zinc, iron, calcium, aluminum and magnesium.

15. The process of claim 12 in which excess phosphoric acid build-up in the bath is consumed by additions of zinc, ZnO, Zn(OH)$_2$.

16. In a process for electrocoating with paint a cathodically-charged substrate immersed in a coating bath containing an aqueous dispersion of said paint, said bath having a cathode zone containing said substrate and an anode zone containing a charged anode, the charged electrodes being maintained in electrical contact with each other by means of said bath, wherein said bath comprises a cationic film-forming polymer, an acidic ionizing agent, and a crosslinking agent, the improvement which comrpises:

employing phosphoric acid as the acidic ionizing agent;

employing as the cationic film-forming polymer a graft copolymer comprising an epoxide grafted onto an acrylic backbone portion and consisting essentially of, by weight based on the graft copolymer, about:

a. in the acrylic backbone portion: 80 to 92% of a polymer or copolymer of at least one unit selected from alkyl, aminoalkyl and hydroxyalkyl acrylates and methacrylates with 0.02 to 0.1 equivalent of secondary and/or tertiary amine functionality; and b. in the graft: 20 to 8% of a graft comonomer which is a glycidyl ester of a tertiary carboxylic acid containing 7 to 9 atoms; and employing as the crosslinking agent a composition which is nonreactive in the bath but reactive with said film-forming polymer at elevated temperatures to crosslink it to form a durable paint film.

17. A process of claim 16 in which the graft copolymer consists essentially of, by weight based on the graft copolymer, about:

a. 89% of a copolymer contributing:
   10% methyl methacrylate,
   44% 2-ethyl hexyl acrylate,
   7.5% t-butylaminoethyl methacrylate,
   2.5% dimethylaminoethyl methacrylate, and
   25% hydroxyethyl methacrylate,
   graft copolymerized with b. 11% of $$R_2 - \underset{\underset{R_3}{|}}{\overset{\overset{R_1}{|}}{C}} - \overset{\overset{O}{\|}}{C} - O - CH_2 - \overset{O}{\overset{/\backslash}{CH - CH_2}}$$

wherein the $R_1$, $R_2$ and $R_3$ groups are saturated aliphatic chains which contain a total of 7 to 9 carbon atoms, and at least one of $R_1$, $R_2$ and $R_3$ is a methyl group.

18. A process of claim 17 in which the bath also contains dissolved dihydrogen phosphate salts of one or more of zinc, iron, calcium, aluminum and magnesium.

19. The process of claim 16 in which excess phosphoric acid build-up in the bath is consumed by additions of zinc, ZnO, or Zn(OH)$_2$.

* * * * *